United States Patent [19]

McCarthy

[11] 4,181,201

[45] Jan. 1, 1980

[54] SPRING ACTUATED, SOLENOID RELEASED BRAKE MECHANISM

[75] Inventor: Richard H. McCarthy, Greenfield, Wis.

[73] Assignee: FMC Corporation, San Jose, Calif.

[21] Appl. No.: 909,314

[22] Filed: May 24, 1978

[51] Int. Cl.² .............................................. B60T 13/04
[52] U.S. Cl. ................................. 188/171; 188/72.9; 192/70.24; 192/70.27; 192/90; 310/77
[58] Field of Search ...................... 188/171, 173, 72.9, 188/170, 72.6, 72.7, 163; 192/90, 93 R, 89 A, 70.24, 70.27, 70.3; 318/370, 372; 310/76, 77

[56] References Cited

U.S. PATENT DOCUMENTS

| | | | |
|---|---|---|---|
| 2,620,901 | 12/1952 | Stearns | 188/171 |
| 2,939,551 | 6/1960 | Hansen | 188/171 |
| 2,964,137 | 12/1960 | Luedtke et al. | 188/171 X |
| 3,137,368 | 6/1964 | Press et al. | 188/72.6 |
| 3,171,515 | 3/1965 | Wolfe | 188/171 |
| 3,221,845 | 12/1965 | Hansen | 188/171 |
| 3,500,971 | 3/1970 | McCarthy | 188/171 |

FOREIGN PATENT DOCUMENTS 280032 11/1927 United Kingdom ..................... 188/171

Primary Examiner—George E. A. Halvosa
Attorney, Agent, or Firm—A. J. Moore; John F. Verhoeven

[57] ABSTRACT

A brake mechanism is disclosed wherein a support lever is pivoted at a pivot end to a stationary end plate and is urged by a spring, which engages the support lever at its free end, toward the end plate to effect clamping of a rotatable friction disc between a brake shoe and friction plates disposed near the pivot end of the support lever. A solenoid is mounted on the support lever and is connected to a cam pivoted to the end plate and adapted to contact the support lever near its free end to overcome the force of the spring and to release the brake when the solenoid is energized. The location of the spring and cam near the free end of the lever and the configuration of the lever provides mechanical advantages that permits the use of a smaller solenoid and spring. The arrangement of parts is such that the solenoid mechanical advantage is between approximately 24-32 to 1, depending upon the selected brake releasing clearance, while the spring mechanical advantage is approximately 8½ to 1.

10 Claims, 3 Drawing Figures

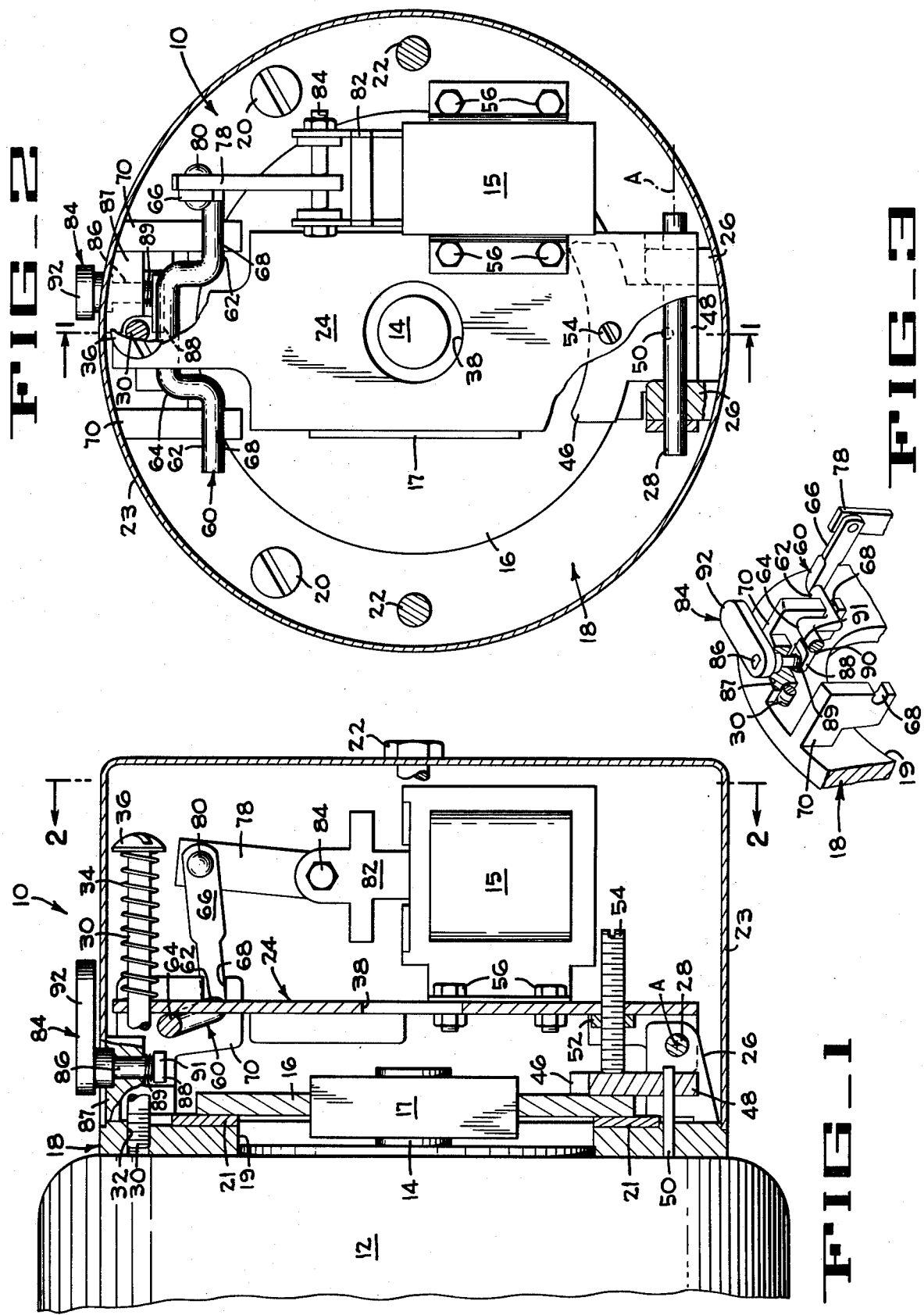

SPRING ACTUATED, SOLENOID RELEASED BRAKE MECHANISM

BACKGROUND OF THE INVENTION

1. Field of the Invention

This invention pertains to a brake mechanism for motors or the like, and more particularly relates to spring set, magnetically released brakes that are simple in construction, provide considerable mechanical advantage permitting the use of smaller power means, and provide independent torque adjusting and wear adjusting devices.

2. Description of the Prior Art

Spring set, magnetically released brakes are, of course, broadly old in the art as evidenced by several of my previously issued patents.

My U.S. Pat. No. 3,556,266 which issued on Jan. 19, 1971 is now assigned to the assignee of the present invention. This patent discloses a rotatable brake disc that is driven by a motor and includes either one or two braking units. Each braking unit includes a pair of bolts connected to a solenoid housing, which bolts support a pair of floating non-rotatable brake plates on opposite sides of the disc. Springs on each bolt normally clamp the disc between the plates to set the brake. The brake is released upon energization of the motor and simultaneous energization of the solenoid which overcomes the spring force and magnetically withdraws one non-rotatable brake plate from the disc. It will be noted that the solenoid is positioned to exert a linear pull on the adjacent brake plate without the aid of any mechanical advantage in order to release the brake, and that no single point independent adjustment for the torque and frictional wear of the brake surfaces are provided.

My U.S. Pat. No. 3,525,424 which issued on Aug. 25, 1970 and is now assigned to the assignee of the present invention also discloses a spring set, magnetically released brake. This patent discloses a motor which drives a disc when the motor and a brake release solenoid are energized. A mounting plate having a friction braking surface is secured to the motor on one side of the disc, and a brake plate is slidably disposed on the opposite side of the disc by two elongated posts that are rigidly secured to the mounting plate. The posts also provide support for a stamped frame, a solenoid, a brake applying spring, the pivot point of the lever, and a manual brake releasing arm. An adjustable thrust member carried by the lever near its pivot point engages the brake plate when the solenoid, which is connected to the opposite end of the lever, is de-energized. An adjustable compression spring is disposed between the lever and the stamped frame and applies braking pressure to the lever near its pivot end, not near its free end. It is noted that the solenoid is not carried by the lever nor does it pivot the lever through a cam that provides a mechanical advantage.

My U.S. Pat. No. 3,500,971 which issued on Mar. 17, 1970 and is now assigned to the assignee of the present invention discloses a spring set, magnetically released brake which operates through a lever pivoted to a back plate, not the end plate. Both the brake applying spring and the brake shoe engaging members are connected to the lever for independent adjustment but are both disposed near the pivot point of the lever. A cam surface on the upper end of the lever is engaged by the roller of a U-shaped bracket which is pivoted to the back plate, not the end plate, and is actuated by a solenoid secured to the back plate for causing the roller to move down the camming surface and overcome the urging of the torque applying spring to release the brake upon energization of the solenoid. This apparatus also discloses a hook type manually operated brake release. This apparatus provides a mechanical advantage to the solenoid of about one-half that of the brake mechanism of the subject invention.

U.S. Pat. No. 3,221,845 which issued to Hansen on Dec. 7, 1965 and is now assigned to the assignee of the present invention discloses a generally U-shaped cam shaft which is operated by a solenoid to release the brake.

SUMMARY OF THE INVENTION

The brake mechanism of the present invention is associated with a driven shaft journaled in a frame or housing and is provided for stopping the shaft when the power to the shaft is interrupted. The brake mechanism includes a rotatable brake disc secured to the shaft. A support lever is pivoted at one end to an end plate secured to the housing at a point radially outward of the disc. An anchored resilient means engages the lever for urging the lever to pivot in one direction; and a cam is pivoted on the end plate and connected to a solenoid for urging the cam against the lever for pivoting the lever in the other direction in response to energization of the solenoid. The cam and the resilient means both contact the lever at points radially outward of the disc and diametrically opposite the pivot point of the lever. A non-rotatable brake shoe is mounted immediately adjacent the pivot point of the lever and is contacted by an abutment means on the lever near its pivot point for engaging and clamping the disc between the braking surface and the brake shoe when said lever is pivoted in one of said directions and for releasing clamping engagement when the lever is pivoted in the opposite direction.

The brake mechanism is preferably a spring set, magnetically released brake provided for stopping the shaft of a motor when the motor and solenoid are simultaneously de-energized. The brake mechanism is also arranged to provide considerable mechanical advantage so that the solenoid and the spring may both be less powerful and less expensive than solenoids and springs used on prior art devices. Independent adjustable devices are also provided for compensating for wear of friction surfaces and for adjusting the brake applying torque.

It is therefore one object of the present invention to provide a spring set, magnetically released brake mechanism having a high brake release mechanical advantage of between about 32-24 to 1 and a spring set mechanical advantage of about 8½ to 1.

Another object of the present invention is to provide a brake mechanism having a brake releasing solenoid supported by a pivotal brake applying and releasing lever.

A further object is to provide a brake mechanism designed to employ a minimum of parts while providing high mechanical advantage for both releasing and engaging the brake.

BRIEF DESCRIPTION OF THE DRAWINGS

FIG. 1 is a vertical central section of the brake mechanism of the present invention taken along lines 1—1 of FIG. 2 shown connected to a fragment of a drive motor and with the brake in a set or engaged position.

FIG. 2 is a vertical section of the brake mechanism of FIG. 1 taken along lines 2—2 of FIG. 1.

FIG. 3 is a fragmentary perspective of a manually operable brake releasing latch with the latch being shown shifted 90° into the brake releasing position.

DESCRIPTION OF THE PREFERRED EMBODIMENT

The brake mechanism 10 (FIGS. 1 and 2) of the present invention is preferably a spring set, magnetically released brake mounted on a motor 12 for normally braking or stopping the motor shaft 14 but permitting rotation of the shaft when the motor and a brake releasing solenoid 15 are energized. It will be understood, however, that the brake mechanism may be mounted on other frames or housings through which a driven shaft extends.

The brake mechanism 10 comprises a brake disc 16 having a square opening that is held from rotation relative to a square hub 17 keyed to the motor shaft but permitting the disc 16 to move axially of the shaft.

An end plate 18, which is preferably a casting, has a central aperture 19 therein and is connected to the end face of the motor 12 by capscrews 20, and has upper and lower stationary steel brake plates 21 (or an annulus) cast into the end plate in position to engage the inner face of the disc 16 adjacent its periphery when the brake is engaged. A pair of threaded holes in the end plate 18 receive capscrew 22 which secure a bowl shaped housing 23 over the operative components of the brake mechanism 10 during operation as is well known in the art.

A support lever 24 extends diametrically of the disc 16 and is pivoted at its lower end to a pair of spaced pivot ears 26 by a pivot pin 28 at a point radially outward of said disc. The pivot ears are preferably formed integrally with the end plate. The upper end of the support lever 24 is apertured to loosely receive a torque adjusting screw 30 that is screwed into a threaded boss 32 at the upper end of the end plate 18 radially outward of the disc 16 and diametrically opposite the pivot axis A of the lever. Resilient means in the form of a torque applying, helical compression spring 34 is fitted around the shank of the screw 30 between its head 36 and the outer surface of the support lever 24 to urge the lever in a counterclockwise direction (FIG. 1). The lever 24 is also provided with a hole 38 concentric with the motor shaft 14 to permit shafts longer than that illustrated in FIG. 1 to extend therethrough.

A generally T-shaped, non-rotatable brake shoe 46 includes a mounting portion 48 that projects downwardly between said pivot ears 26 and is apertured to slide upon a pin 50 (FIG. 2) and between the ears toward and away from the disc.

The pin 50 is secured to the end plate 18. A disc engaging portion of the shoe engages the outer face of the disc 16 adjacent its periphery. A clinch nut 52 (FIG. 1) is swedged into the support lever 24 and receives a wear adjustment screw 54 which is adjusted to contact and urge the shoe 46 into frictional braking engagement with the disc 16 when the parts are positioned in the brake engaging or spring set position illustrated in FIG. 1.

In order to release the brake, the solenoid 15 is connected to a transversely extending portion of the lever 24 by bolts 56. As illustrated in FIG. 2, the solenoid 15 is preferably offset to the right of the shaft. A cam 60 is formed from a single rod and includes a pair of pivot sections 62, a U-shaped lever engaging cam portion 64 that is positioned to engage the lever at a point radially outward of the disc 16 and immediately adjacent the spring 34, and an actuating lever arm 66 which has a flattened outer portion with a hole therein. The pivot sections 62 of the cam 60 are pivotally supported in open U-shaped slots 68 (FIGS. 1 and 3) formed in cam pivot ears 70 that are preferably formed integral with the end plate 18. It will be noted that the forces acting on the cam 60 are designed to urge the pivot section 62 into the slot 68 at all times thereby requiring no additional structure to maintain the cam in engagement with the ears 70. A link 78 is pivotally connected to the arm 66 by a connector such as a bolt or rivet 80, and to the armature 82 of the solenoid 15 by a bolt 84.

It will be understood that many different sizes of brake mechanisms can be constructed in accordance with the present invention. The illustrated embodiment is designed for a friction disc having a diameter of about 3¾ inches. The illustrated brake requires a solenoid air gap of only about ¼ inch which is a small gap when compared to prior art devices. The ¼ inch air gap when closed by energization of the solenoid 15 induces sufficient lever movement to provide a clearance between the disc 16 and its adjacent non-rotatable friction surfaces of between about 0.008 to 0.012 inches. When the clearance is about 0.008 inches, a brake releasing mechanical advantage of about 32 to 1 is achieved, while a clearance of 0.012 inches will provide a mechanical advantage of about 24 to 1. It will also be noted that energization of the solenoid will cause the actuating arm 66 to extend in a direction substantially normal to the linear path of movement of the solenoid armature 82, and that the U-shaped cam 64 extends substantially parallel to the lever arm.

The brake mechanism 10 is also provided with means for manually releasing and latching the brake in released position. For this purpose, a manually operated latching device 84 (FIGS. 1-3) is provided with a shaft 86 rotatably received in a bore in a web 87 disposed between and preferably integral with the end plate and one of the cam pivot ears 70. The web 87 also serves as a stop to prevent excessive pivotal movement of the cam 60 in a counterclockwise direction (FIG. 1).

A cam engaging latch arm 88 is rigidly secured to the lower end of the shaft 86 and is urged to pivot into its illustrated inoperative FIG. 1 position by a torsion spring 89 disposed between the arm 88 and the lower surface of the web 87. The cam engaging edge of the arm 88 has rounded corners 90 (FIG. 3) and a flat end 91. The upper portion of the shaft 86 receives a handle 92 which is rigidly secured to the shaft 86 by a set screw (not shown). The handle 92 is preferably disposed 90° to the latch arm. Thus, if it is desired to manually latch the brake in its release position, the operator merely turns the handle 90° causing a rounded corner 90 of the latch arm 88 to engage the U-shaped portion 64 of the cam and pivot it and the supporting lever 24 against the urging of the torque applying spring 34 to the manual brake releasing position. The flat end 91 of the latch arm 88 is sufficiently wide to overcome the torsional force of the spring 89 thereby providing sufficient frictional resistance to maintain the latch in desired position.

As mentioned above, the stroke of the solenoid is about ¼ inch in the preferred embodiment of the invention. The manual latching device 84 when adjusted in its latching position moves the solenoid armature 82 downwardly only about 3/16th of an inch which is sufficient to release the brake. The latching device may be unlatched either manually or by energization of the solenoid 15 which moves the armature downward an additional 1/16th of an inch permitting the torsion spring 89 to pivot the manual latching device 84 to its unlatched position.

An important feature of the invention is that the pivot points of the support lever 24 and cam 60 relative to their points of application of brake applying and brake releasing forces, respectively, provide substantial mechanical advantage requiring a smaller spring 34 and a smaller solenoid 15 than used in prior art devices of the same braking capacity. The spring 34 preferably has a spring rate which provides a substantially constant brake applying pressure on the brake shoe. Since the force applied by the solenoid when energized to release the brake is substantially constant, the spring is adjusted so that the solenoid force will slightly overcome the spring force when both forces are applied through their associated lever arms. This force adjustment minimizes the hammering effect of the solenoid.

As mentioned previously, the brake releasing mechanical advantage may be controlled by adjusting the clearance between the disc 16 and the non-rotatable friction surfaces of the plates 21 and the shoe 46. When this clearance is about 0.008 inches a releasing mechanical advantage of about 32 to 1 is achieved. When this clearance is about 0.012 inches this mechanical advantage is about 24 to 1. The mechanical advantage in the brake applying direction is about 8½ to 1.

Another feature of the invention is that the brake pressure or torque may be adjusted at a single point by merely tightening or loosening the adjustment screw 30; and brake wear may be compensated for at a single point, and independently of the torque adjustment by merely tightening the wear adjustment screw 54.

A further feature of the invention is that mounting the solenoid directly upon the lever results in fewer and simpler parts.

Although the brake disc 16 has been illustrated as being formed from a composite material, and the stationary brake plates 21 and non-rotatable brake shoe 46 are illustrated as being metallic, it will be understood that the disc may be metallic and the brake plate 21 and shoe may have composition material bonded thereto to define the friction surfaces. If the brake mechanism 10 is to be used in conjunction with a shaft that must be frequently started and stopped, a metallic disc is preferred since the thermal capacity of the brake is increased due to the more effective cooling of the metallic disc by air currents generated by rotation of the disc.

In operation, the solenoid 15 and motor 12 are preferably wired together so that energization of the motor also causes simultaneous energization of the solenoid. Energization of the solenoid 15 pulls the armature 82 downwardly thereby pivoting the cam clockwise (FIG. 1) against the urging of the spring 34. This pivotal movement of the cam pivots the support lever 24 clockwise about the axis A of pivot pin 28 thereby moving the wear adjustment screw 54 away from the shoe 46 or toward the right (FIG. 1) a sufficient amount to release braking engagement of the brake shoe 46 with the brake disc 16 permitting the disc to axially shift a slight amount on the hub 17.

When the motor 12 and the solenoid 15 are deenergized, the spring 34 returns the cam 60, solenoid armature 82 and lever 24 to their full line positions illustrated in FIG. 1 thereby clamping the disc 16 between the brake shoe 46 and brake plates 21 with sufficient force to frictionally stop the motor shaft 14. In order to positively prevent excessive counterclockwise pivotal movement of the cam 60 upon de-energization of the solenoid, a portion of the web 87 acts as an abutment which may be engaged by the cam portion 64 of the cam 60 to prevent the solenoid armature 82 from being pulled free of the body of the solenoid 15. The torque adjustment screw 30 may be tightened to increase the braking torque if it is desired to more rapidly stop the motor and its shaft, or may be loosened if it is desired to stop the shaft less abruptly.

When wear occurs on the frictional braking surfaces, the wear adjustment screw 54 may be tightened to compensate for wear thereby retaining the originally desired angular movement of the lever resulting in the solenoid gap, the brake clearance, and the spring length being the same as originally preset.

From the foregoing description it is apparent that the brake mechanism of the present invention provides considerable mechanical advantage by arranging the lever and cam points so that lever arms between the pressure applying points of the wear adjustment screw and cam relative to the associated pivot points are at practical minimum distances while the distance between the associated pivot point and the points of application of the force by the spring to engage the brake, and by the solenoid to release the brake, are at a practical maximum. The mechanical advantage realized from the design results in requiring a less powerful solenoid and a smaller torque applying spring. The design also requires fewer parts, and provides for independent single point adjustment for varying the brake applying torque and for compensating for brake wear.

Although the best mode contemplated for carrying out the present invention has been herein shown and described, it will be apparent that modification and variation may be made without departing from what is regarded to be the subject matter of the invention.

I claim:

1. A brake for selectively stopping and permitting rotation of a shaft journalled in a frame, comprising: a brake disc secured to said shaft for rotation therewith, means defining an end plate secured to said frame on one side of said disc and having a disc engaging braking surface, means defining a non-rotatable brake shoe on the other side of said disc mounted for movement toward and away from said disc, a lever pivoted to said end plate at a point radially outward of said disc, abutment means carried by said lever adjacent said pivot point in position to engage said shoe, anchor means secured to said frame, resilient means anchored to said frame by said anchor means for engaging and pivotally urging said lever in one direction, cam means pivoted to said end plate and engaging said lever, and a solenoid carried by said lever and operatively connected to said cam means pivoting the lever in the opposite direction, said points of engagement of said resilient means and said cam means being radially outward of said disc and diametrically opposite said pivot point, said resilient means being disposed between said lever and said anchoring means, said anchoring means being adjustable to vary the braking torque applied to the lever.

2. An apparatus according to claim 1 wherein said anchoring means is a single adjustment screw threaded into said end plate and said resilient means is a helical compression spring disposed between the head of said screw and said lever.

3. An apparatus according to claim 1 wherein said abutment means is a single wear adjustment screw threaded into said lever means and adjustable to compensate for frictional wear of said braking surface, said brake disc and said brake shoe.

4. An apparatus according to claim 1 wherein said cam means is a one-piece rod that is formed to provide a U-shaped abutment means, a pair of spaced pivot sections, and an actuating arm having a flattened end portion, said actuating arm being about three times as long as said U-shaped abutment means from said cam pivot point to provide a mechanical advantage that minimizes the brake releasing force required by said solenoid.

5. A brake for stopping the rotation of a driven shaft journaled in a housing when the power to the shaft is interrupted comprising a rotatable brake disc secured for rotation with the shaft, means defining an end plate secured to said housing and having a braking surface thereon for engaging one side of said disc, means defining an elongated support lever pivoted at one end to said end plate radially outward of said disc, anchoring means connected to said end plate radially outward of said disc, resilient means interposed between said anchoring means and said lever for urging said lever to pivot in one direction, said anchoring means and said resilient means being diametrically opposite said lever pivot point, a solenoid carried by said lever and including an armature, cam means pivoted to said end plate means including an actuating arm pivotally connected to said solenoid armature and an abutment means positioned to engage and pivot said lever in the other direction in response to energization of said solenoid, a non-rotatable brake shoe, means mounting said brake shoe on the other side of said brake disc adjacent said pivot point for movement toward and away from said disc, and abutment means secured to said lever adjacent said pivot point for engaging said shoe and clamping said disc between said braking surface and said shoe when said lever is pivoted in one of said directions and for releasing clamping engagement when said lever is pivoted in the opposite direction, said resilient means urging said brake shoe into braking position, and energization of said solenoid releasing said brake, said anchoring means being adjustable to vary the braking torque applied to the lever.

6. An apparatus according to claim 5 wherein the distance between the pivot point of said lever and the point of contact of said cam means with said lever is about eight times longer than the distance between the pivot point of the lever and the point of contact of said abutment means with said brake shoe thereby minimizing the brake releasing force required by said solenoid.

7. An apparatus according to claim 5 wherein the distance between the pivot point of said lever and the point of contact of said resilient means with said lever is about $8\frac{1}{2}$ times longer than the distance between the lever pivot point and the point of contact of said abutment means with said brake shoe thereby minimizing the force required by said resilient means.

8. An apparatus according to claim 5 and additionally including means for manually latching said brake shoe in its released position; said manual latch means including a shaft journaled in said end plate and having a manually operable handle on one end and a latching arm on the other end with rounded corners and a flat end portion; a torsion spring connected between said latching arm and said end plate for urging said arm into unlatched position; said rounded corners of said latching arm engaging said cam means, compressing said resilient means, and moving said resilient means and said cam means into brake releasing position with the flat end of said arm bearing against said cam; said resilient means being of sufficient strength to overcome the torsional force of said torsion spring until manually released or until said solenoid is energized to further compress said resilient means.

9. An apparatus according to claim 5 wherein said anchoring means is a single adjustment screw threaded into said end plate and said resilient means is a helical compression spring disposed between the head of said screw and said lever.

10. An apparatus according to claim 5 wherein said abutment means is a single wear adjustment screw threaded into said lever means and adjustable to compensate for frictional wear of said braking surface, said brake disc and said brake shoe.

* * * * *